US011236253B2

(12) United States Patent
Yamanari et al.

(10) Patent No.: US 11,236,253 B2
(45) Date of Patent: Feb. 1, 2022

(54) PRESSURE-SENSITIVE ADHESIVE SHEET

(71) Applicant: NITTO DENKO CORPORATION, Osaka (JP)

(72) Inventors: Yusuke Yamanari, Osaka (JP); Makoto Saito, Osaka (JP); Naoaki Higuchi, Osaka (JP); Kenta Jozuka, Osaka (JP)

(73) Assignee: NITTO DENKO CORPORATION, Osaka (JP)

(*) Notice: Subject to any disclaimer, the term of this patent is extended or adjusted under 35 U.S.C. 154(b) by 0 days.

(21) Appl. No.: 15/862,989

(22) Filed: Jan. 5, 2018

(65) Prior Publication Data
US 2018/0194975 A1    Jul. 12, 2018

(30) Foreign Application Priority Data

Jan. 10, 2017 (JP) .............................. JP2017-001894

(51) Int. Cl.
*C09J 7/38* (2018.01)
*C09J 7/25* (2018.01)
(Continued)

(52) U.S. Cl.
CPC .................. *C09J 7/385* (2018.01); *C09J 7/22* (2018.01); *C09J 7/25* (2018.01); *C09J 7/255* (2018.01);
(Continued)

(58) Field of Classification Search
None
See application file for complete search history.

(56) References Cited

U.S. PATENT DOCUMENTS 8,445,079 B2 * 5/2013 Iida .................... C07D 311/96
252/301.16
2005/0209380 A1   9/2005 Wada et al.
(Continued)

FOREIGN PATENT DOCUMENTS

CN       103703093 A      4/2014
CN       104774570 A      7/2015
(Continued)

OTHER PUBLICATIONS

Takeda Sangyo Polygrace(R) Polyurethane Films: https://www.takeda-sangyo.com/en/polygrace.html (Year: 2021).*
(Continued)

*Primary Examiner* — Frank J Vineis
*Assistant Examiner* — Nicole T Gugliotta
(74) *Attorney, Agent, or Firm* — Greenblum & Bernstein, P.L.C.

(57) ABSTRACT

Provided is a PSA sheet highly durable against repeated deformation and suited for use in a flexible device as well. The PSA sheet provided by this invention comprises a PSA layer. The PSA sheet shows a recovery rate at 100% elongation of 70% or higher. The PSA layer shows a displacement of 0.5 mm or greater according to the following holding power test:
<Holding Power Test>
At 23° C., the PSA layer is applied over a 10 mm wide by 20 mm long bonding area to a Bakelite plate as an adherend; a 1 kg load is applied in the length direction; after one hour, the displacement from the initial position where first applied is determined.

17 Claims, 1 Drawing Sheet

(51) Int. Cl.
*C09J 133/14* (2006.01)
*C09J 133/06* (2006.01)
*C09J 7/20* (2018.01)
*C09J 133/00* (2006.01)
*C08L 93/04* (2006.01)
*C09J 7/22* (2018.01)

(52) U.S. Cl.
CPC ....... *C09J 133/14* (2013.01); *C09J 2203/326* (2013.01); *C09J 2301/312* (2020.08); *C09J 2423/006* (2013.01); *C09J 2433/00* (2013.01); *C09J 2467/006* (2013.01); *C09J 2475/006* (2013.01)

(56) References Cited

U.S. PATENT DOCUMENTS

| | | | |
|---|---|---|---|
| 2012/0189829 A1* | 7/2012 | Jozuka | C09J 7/22 428/216 |
| 2014/0141271 A1 | 5/2014 | Uemura et al. | |
| 2017/0158918 A1* | 6/2017 | Jozuka | C08L 93/00 |
| 2018/0291240 A1 | 10/2018 | Behling et al. | |

FOREIGN PATENT DOCUMENTS

| | | | | |
|---|---|---|---|---|
| CN | 104877605 A | 9/2015 | | |
| EP | 2 913 373 A1 | 9/2015 | | |
| EP | 2913373 A1 | * 9/2015 | ............. | C08L 61/04 |
| JP | 2005263917 A | 9/2005 | | |
| JP | 2009-024130 A | * 2/2009 | ............... | C09J 7/00 |
| JP | 2015-165023 A | 9/2015 | | |
| JP | 2015165023 A | 9/2015 | | |
| JP | 2016-29155 A | 3/2016 | | |
| JP | 2016-113506 A | 6/2016 | | |
| WO | 2013002288 A1 | 1/2013 | | |
| WO | 2016013442 A1 | 1/2016 | | |
| WO | WO 2016/013442 | * 1/2016 | ............. | C08L 93/00 |
| WO | 2016196541 A1 | 12/2016 | | |

OTHER PUBLICATIONS

Office Action issued in Chinese Patent Application No. 201711485503.2, dated Jan. 25, 2021, English translation.
Notice of Allowance, Japanese Patent Application No. 2017-001894, dated Nov. 12, 2020.
Office Action issued in Taiwanese Patent Application No. 107100746, dated Jul. 13, 2021, English translation (all references previously cited).

* cited by examiner

PRESSURE-SENSITIVE ADHESIVE SHEET

CROSS-REFERENCE

The present application claims priority to Japanese Patent Application No. 2017-001894 filed on Jan. 10, 2017; the entire content thereof is incorporated herein by reference.

BACKGROUND OF THE INVENTION

Field of the Invention

The present invention relates to a pressure-sensitive adhesive sheet.

Description of the Related Art

In general, pressure-sensitive adhesive (or PSA; the same applies hereinafter) has characteristics to be in a soft solid (viscoelastic) state in a room temperature range and adhere to adherend under some pressure. With such characteristics, PSA has been widely used for part-joining, surface protection, etc., in various industrial fields from home appliances to automobiles, OA equipment, and so on, typically as a PSA sheet comprising a layer of the PSA. PSA sheets are preferably used, for instance, in portable electronic devices such as mobile phones, smartphones, and tablet PCs as well as in other portable devices. Technical documents related to PSA sheets include Japanese Patent Application Publication No. 2016-029155 and No. 2015-165023.

SUMMARY OF THE INVENTION

Lately, flexible devices such as bendable and rollable mobile electronic devices are drawing attention. Japanese Patent Application Publication No. 2016-113506 discloses a transparent silicone rubber film for use as a stress-relaxation layer between components constituting a flexible device. Japanese Patent Application Publication No. 2016-113506 teaches that the transparent silicone rubber film is preferably bonded with PSA to each component (paragraph 0044) while it does not disclose a specific composition of adhesive or PSA suited for such bonding. PSA sheets used in flexible devices are desired to show insusceptibility to leaving creases (i.e. crease resistance) and a property to maintain proper adhesion against repeated deformation such as bending (i.e. peel resistance). However, conventional art has not been satisfactory in fulfilling such desire.

An objective of the present invention is to provide a PSA sheet that is highly durable against repeated deformation and also suitable for use in flexible devices.

Solution to Problem

The present description provides a PSA sheet comprising a PSA layer. The PSA sheet shows a recovery rate of 70% or higher after elongated by 100%. The PSA layer shows a displacement of 0.5 mm or greater in the next holding power test.
<Holding Power Test>
At 23° C., to a Bakelite plate as an adherend, the PSA layer is adhered over a 10 mm wide and 20 mm long bonding area; a 1 kg load is applied in the length direction; and after one hour, the displacement from the initial point where first applied is measured.

When the holding time (time held) in the holding power test is less than one hour, that is, when the sample falls off the adherend in less than one hour after the load is applied, the displacement from the initial point where first applied cannot be determined. Thus, when a PSA layer shows a holding time less than one hour in the holding power test, it is excluded from the concept of the PSA layer that satisfies the displacement of 0.5 mm or greater. As used herein, the concept of flexing encompasses bending, folding, rolling, etc. Hereinafter, durability against repeated flexing may be referred to as flexproof properties.

The PSA sheet thus constituted may show high flexproof properties, having the PSA layer that combines great deformability in planar direction (in shear direction) and suitable cohesive strength while exhibiting great reversibility with respect to elongation.

The PSA sheet according to some embodiments shows a maximum tensile strength of 15 N/10 mm or less at 100% elongation. According to such a PSA sheet, great flexproof properties are likely to be obtained.

The art disclosed herein can be preferably implemented in an embodiment of the PSA sheet having a thickness of 250 µm or less. According to such a PSA sheet, great flexproof properties are likely to be obtained.

In some embodiments, the PSA forming the PSA layer comprises a base polymer and a tackifier resin. The PSA sheet disclosed herein can be favorably made, using a PSA having such a composition. A favorable example of the base polymer is an acrylic polymer.

In some embodiments, the tackifier resin may comprise a tackifier resin $T_L$ having a softening point of 50° C. or higher and lower than 105° C. With such a tackifier resin $T_L$, a PSA layer showing a preferable displacement disclosed herein is likely to be obtained. The tackifier resin $T_L$ content in the PSA layer can be greater than 10 parts by weight to 100 parts by weight of the base polymer.

The PSA may comprise a crosslinking agent. With the use of the crosslinking agent, the PSA layer is likely to be obtained, combining great deformability in shear direction and suitable cohesive strength. Thus, the PSA sheet is likely to be obtained with great flexproof properties.

In some embodiments, the PSA layer preferably shows a distance returned in 5 minutes after the load is removed of 0.05 mm or greater. According to the PSA sheet comprising such a PSA layer, excellent flexproof properties can be obtained.

The PSA sheet according to some embodiments comprises a substrate and the PSA layer provided at least on one face of the substrate. The art disclosed herein can be preferably implemented in an embodiment of the PSA sheet having such a structure. As the substrate, it is preferable to use a stretchable substrate comprising, as its primary component, for instance, a resin selected from the group consisting of polyurethane, polyolefin and olefinic elastomer.

The PSA sheet disclosed herein can be preferably used in flexible devices. In particular, it is favorable for fixing and protecting components of mobile electronics having flexible displays.

The scope of the invention for which the present application seeks patent protection may include appropriate combinations of the respective features described above.

DETAILED DESCRIPTION OF THE INVENTION

Preferred embodiments of the present invention are described below. Matters necessary to practice this invention other than those specifically referred to in this description can be understood by a person skilled in the art based on the disclosure about implementing the invention in this description and common technical knowledge at the time the application was filed. The present invention can be practiced based on the contents disclosed in this description and common technical knowledge in the subject field.

As used herein, the term "acrylic polymer" refers to a polymer whose polymeric structure includes a monomeric unit derived from an acrylic monomer, typically to a polymer that includes more than 50% acrylic monomer-derived monomeric unit by weight. As used herein, the acrylic monomer refers to a monomer having at least one (meth) acryloyl group per molecule. Here, the "(meth)acryloyl group" comprehensively refers to acryloyl group and methacryloyl group. Thus, the concept of acrylic monomer here may encompass both an acrylic monomer (a monomer having an acryloyl group) and a methacrylic monomer (a monomer having a methacryloyl group). Similarly, as used herein, the term "(meth)acrylic acid" comprehensively refers to acrylic acid and methacrylic acid; "(meth)acrylate" to acrylate and methacrylate.

<Constitution of PSA Sheet>

The PSA sheet disclosed herein comprises a PSA layer. The PSA sheet is typically an on-substrate PSA sheet having a PSA layer on at least one face (preferably each face) of a substrate (support). The concept of PSA sheet herein encompasses so-called PSA tapes, PSA labels, PSA films and the like. The PSA sheet disclosed herein may be in a rolled form or in a flat sheet form, or may be processed into various other shapes.

Figure 1:
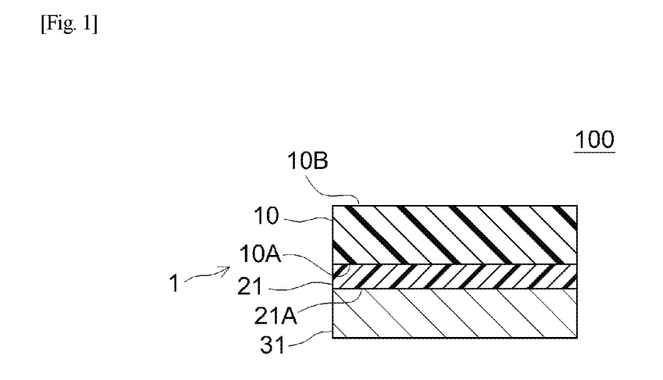
FIG. 1 shows a cross-sectional view schematically illustrating the constitution of the PSA sheet according to an embodiment.

FIG. 1 schematically shows an embodiment of the PSA sheet disclosed herein. The PSA sheet (single-faced PSA sheet) 1 comprises a substrate sheet 10 having a first face 10A and a second face 10B, and a PSA layer 21 provided on the first face 10A side. PSA layer 21 is permanently provided to the first face 10A side of substrate 10, that is, it is not to be separated from substrate 10. PSA sheet 1 is used by adhering PSA layer 21 to an adherend. As shown in FIG. 1, before used (before adhered to the adherend), PSA sheet 1 may be a component of a PSA sheet 100 with release liner wherein the surface (adhesive face) 21A of PSA layer 21 is protected with release liner 31 that has a release face at least on the side facing the PSA layer 21. For instance, a preferable release liner 31 has a release face on one face of a substrate sheet (liner substrate), formed by providing a release agent layer to the one face. Alternatively, it may be in an embodiment (in a roll) where release liner 31 is omitted; and with substrate 10 having a release face on the second face 10B, PSA sheet 1 is wound so that the second face 10B of substrate 10 comes in contact with and protects the adhesive face 21A.

Figure 2:
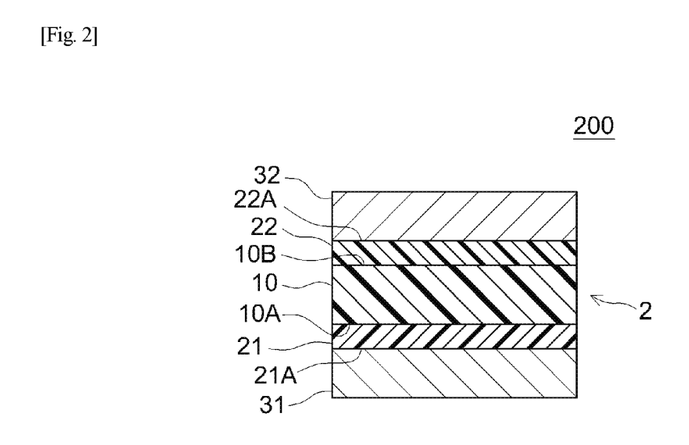
FIG. 2 shows another cross-sectional view schematically illustrating the constitution of the PSA sheet according to an embodiment.

FIG. 2 schematically shows the constitution of the PSA sheet according to another embodiment. PSA sheet 2 is formed as a double-faced PSA sheet (i.e. adhesively double-faced PSA sheet) comprising a substrate sheet 10 having a first face 10A and a second face 10B, a first PSA layer 21 permanently provided to the first face 10A side, and a second PSA layer permanently provided to the second face 10B side. One or each of the PSA layers 21 and 22 shows a displacement of 0.5 mm or greater in the holding power test described later. PSA sheet 2 is used by adhering PSA layers 21 and 22 to different areas of adherend. The areas to which PSA layers 21 and 22 are adhered may be of different components or different areas in one component. As shown in FIG. 2, before used, PSA sheet 2 may be a component of a PSA sheet 200 with release liner, wherein the surface (first adhesive face) 21A of the first PSA layer 21 and the surface (second adhesive face) 22A of the second PSA layer 22 are protected with release liners 31 and 32 having release faces at least on sides facing the PSA layers 21 and 22. As release liners 31 and 32, for instance, it is preferable to use a kind formed by providing a layer of release agent to one face of a substrate sheet (liner substrate) to form a release layer so that the one face is a release face. Alternatively, the PSA sheet with release liner may be in an embodiment (in a roll) where release liner 32 is omitted; and release liner 31 having a release face on each side and PSA sheet 2 are layered and wound together so that the backside of release liner 31 comes in contact with and protects the second adhesive face 22A.

As the release liner, any conventional release paper or the like can be used without any particular limitations. Examples include a release liner having a release layer on a surface of a substrate such as resin film and paper; and a release liner formed from a low-adhesive material such as a fluorine-based polymer (polytetrafluoroethylene, etc.) and a polyolefin-based resin (polyethylene (PE), polypropylene (PP), etc.). The release layer can be formed, for instance, by subjecting the substrate to a surface treatment with a release agent such as a silicone-based, a long-chain alkyl-based, a fluorine-based, a molybdenum disulfide-based release agent or the like.

<Properties of PSA Sheet>

(Recovery Rate)

The PSA sheet disclosed herein shows a recovery rate at 100% elongation (or simply a recovery rate, hereinafter) of 70% or higher. When the PSA sheet has a low recovery rate, it cannot sufficiently accommodate stretching associated with repeated flexing and it becomes longer than the length initially applied. The extra length of the PSA sheet is likely to cause wrinkling and lifting of the PSA sheet and creases are also likely to remain. According to the PSA sheet with a high recovery rate, their occurrence is reduced and great flexproof properties are readily obtained. In some embodiments, the recovery rate of the PSA sheet can be 75% or higher, 80% or higher, or even 85% or higher, for instance, 90% or higher. The recovery rate can be essentially 100%. In view of the practicality, the recovery rate can be about 98% or lower, or even about 95% or lower.

The recovery rate of the PSA sheet is determined based on the result of the 100% elongation test carried out under the conditions shown below. The same method is employed in Examples described later.

<100% Elongation Test>

Sample shape: 10 mm wide strip
Initial chuck distance: 20 mm
Tensile speed: 300 mm/min
Recovery speed: 300 mm/min
Tensile deformation: 100%

Procedures: In a measurement environment at 23° C. and 50% RH, the sample is placed between chucks in a tensile tester, with the initial chuck distance L0 as shown above; at the tensile speed shown above, the sample is stretched until the chuck distance reaches 40 mm (i.e. elongated by 100%)

and held in this state for one second. While the chucks are returned to the original point at the recovery speed shown above, the stress is monitored.

In the 100% elongation test, when the stress becomes zero while the chucks are returned, the chuck distance L1 is detected and the recovery rate is determined by the equation shown below. Here, L0 is the initial chuck distance and L2 the chuck distance at 100% elongation. That is, L0 is 20 mm and L2 is 40 mm.

$$\text{Recovery rate (\%)}=(1-(L1-L0)/(L2-L0))\times 100$$

In the test, the tensile direction is not particularly limited, but is preferably in the length direction of the PSA sheet. As the tensile tester, product name "Autograph AG-10G Tensile Tester" available from Shimadzu Corporation can be used. The recovery rate can be adjusted, for instance, through the crosslinking degree of the PSA layer and the weight average molecular weight (Mw) of the base polymer, or through selection of a substrate material in a substrate-containing PSA sheet.

(Maximum Tensile Strength)

The maximum tensile strength at 100% elongation (or simply the maximum tensile strength, hereinafter) of the PSA sheet disclosed herein is not particularly limited. For instance, it can be 25 N/10 mm or less, or even 20 N/10 mm or less. For instance, when the adherend is folded with the side on which the PSA sheet is adhered being on the outside, if the maximum tensile strength of the PSA sheet is high, the load applied in the thickness direction of the PSA layer at the folded ridge tends to increase. Thus, depending on how the PSA sheet is used, the PSA layer at the ridge may flatten and irreversibly thin out; in an extreme case, the PSA layer may split apart at the ridge. With the PSA sheet having a small maximum tensile strength, these events can be prevented or reduced and great peel resistance may be readily obtained. The PSA sheet with a small maximum tensile strength is advantageous also in view of its unlikeliness to impair the ease of deformation of adherend to which the PSA sheet is adhered. In some embodiments, the maximum tensile strength of the PSA sheet can be, for instance, 15 N/10 mm or less, 10 N/10 mm or less, 7 N/10 mm or less, 5 N/10 mm or less, 3 N/10 mm or less, or even 2.5 N/10 mm or less. The lower limit of the maximum tensile strength is not particularly limited. From the standpoint of the ease of handling the PSA sheet, etc., it can be, for instance, 0.2 N/10 mm or greater, 0.5 N/10 mm or greater, 0.8 N/10 mm or greater, 1.0 N/10 mm or greater, or even 1.2 N/10 mm or greater.

The maximum tensile strength of the PSA sheet is determined from the stress profile observed in the 100% elongation test, by detecting the maximum stress while the sample is elongated by 100%. The same method is employed in Examples described later. The recovery rate can be adjusted through selection of a thickness of the PSA sheet, or through selection of a substrate material, etc., when a substrate is included.

(Elongation at Break)

The elongation at break of the PSA sheet disclosed herein is not particularly limited. It is typically greater than 100%; it can be, for instance, 150% or greater. A PSA sheet with large elongation at break is preferable because it is highly accommodating with respect to its deformation. From such a standpoint, in some embodiments, the elongation at break of the PSA sheet can be 200% or greater, 300% or greater, 500% or greater, or even 700% or greater. The maximum elongation at break is not particularly limited. From the standpoint of the ease of processing the PSA sheet, etc., it can be, for instance, 2000% or less, 1500% or less, or even 1000% or less.

The elongation at break of the PSA sheet can be determined as follows: in a measurement environment at 23° C. and 50% RH, a sample prepared into a 10 mm wide strip is placed between chucks in a tensile tester at a chuck distance of 40 mm; based on JIS K 6767, the sample is pulled to break at a rate of 500 mm/min; and the chuck distance L1 at break and the initial chuck distance L0 at the start of pulling are substituted into the next equation:

$$\text{Elongation at break (\%)}=((L1-L0)/L0)\times 100$$

The direction of pulling in the test is not particularly limited. In a long piece of substrate, the direction of pulling is preferably in the length direction (possibly in the machine direction (MD) of the substrate). The elongation at break can be adjusted, for instance, through selection of a material of the substrate possibly in the PSA sheet, etc.

(Holding Power)

The PSA layer forming the PSA sheet disclosed herein, the displacement is preferably 0.5 mm or greater in the holding power test described earlier. Such a PSA layer shows great deformability in planar direction (in shear direction). Thus, for instance, even when the PSA sheet stretches in association with flexing of the adherend, etc., the PSA layer deforms to lessen the distortion in shear direction caused by the stretching so as to maintain a good adhesion state. In addition, because the PSA layer has a level of cohesive strength that prevents the sample from falling in the holding power test, the deformation (e.g. in shear direction) of the PSA layer is highly reversible. This is advantageous in view of increasing the crease resistance. In some embodiments, the displacement can be 0.7 mm or greater, 1.00 mm or greater, or even 1.10 mm or greater. The maximum displacement is not particularly limited. To make it easier to also obtain a level of cohesive strength that prevents the sample from falling, it can be, for instance, 3 mm or less, 2 mm or less, or even 1.5 mm or less. The displacement can be adjusted, for instance, through selection of base polymer (monomer composition, Mw, etc.) of the PSA, selection of a tackifier resin and its amount used, selection of a crosslinking agent and its use, etc.

With respect to the PSA sheet forming the PSA sheet disclosed herein, the distance returned at 5 minutes after the load is removed is advantageously 0.03 mm or greater, or preferably 0.05 mm or greater. The PSA layer with a large distance returned is highly deformable relative to a load in shear direction and can recover well to its original shape when the load is removed. With such a PSA layer combining deformability and shape-recovery, a PSA sheet that shows excellent flexproof properties can be obtained. In some embodiments, the distance returned can be 0.08 mm or greater, 0.10 mm or greater, or even 0.12 mm or greater. The maximum distance returned is not particularly limited. To make it easier to also obtain a level of cohesive strength that prevents the sample from falling, it can be, for instance, 1.0 mm or less, 0.5 mm or less, or even 0.3 mm or less. The distance returned can be adjusted, for instance, through selection of a base polymer (monomer composition, Mw, etc.) of the PSA, selection of a tackifier resin and its amount used, selection of a crosslinking agent and its use, etc.

The displacement and the distance returned are measured relative to the PSA layer's backside (the surface on the reverse side of the face applied to adherend). When the holding power test is carried out with a suitable backing material (e.g. resin film such as polyethylene terephthalate film) applied to the backside of the PSA layer, the displacement is measured relative to the backing material's backside (the surface on the reverse side of the face applied to the PSA layer), and the resulting value can be considered the displacement relative to the backside of the PSA layer. The same applies to the distance returned.

The number (N) of samples in the holding power test is suitably 2 or higher, or preferably 3 or higher. When N is two or higher, the displacement and the distance returned are determined by dividing the total of measurement values by N with respect to each sample.

More specifically, the holding power test and the determination of displacement and distance returned are carried out, for instance, by the method described later in Examples.

The thickness of the PSA sheet disclosed herein is not particularly limited. For instance, it can be in a range of about 15 μm to about 500 μm. In some embodiments, in view of the handling properties, adhesive properties, etc., the thickness of the PSA sheet can be, for instance, about 30 μm or greater, about 60 μm or greater, about 90 μm or greater, about 120 μm or greater, or even about 150 μm or greater. In some other embodiments, the thickness of the PSA sheet can be, for instance, about 300 μm or less, about 250 μm or less, about 200 μm or less, about 150 μm or less, less than 120 μm, less than 90 μm, or even less than 60 μm. For instance, when an adherend to which the PSA sheet is applied is bent, with decreasing thickness of the PSA sheet, the difference in degree of deformation will decrease between the outside and the inside of where the sheet is bent. This can decrease the load applied in the thickness direction of the PSA layer at the folded ridge, thereby enhancing the flexproof properties such as peel resistance. The PSA sheet disclosed herein may have a thickness less than 30 μm.

<PSA>

The PSA layer in the art disclosed herein may comprise, as the base polymer, one, two or more species among various species of rubber-like polymer known in the PSA field, such as acrylic polymer, rubber-based polymer, polyester-based polymer, urethane-based polymer, polyether-based polymer, silicone-based polymer, polyamide-based polymer, and fluoropolymer.

In a preferable embodiment, from the standpoint of the flexibility and facile molecular design in adjusting the adhesive properties (typically, the adhesive strength) and the viscoelasticity as well as of the stability with aging, etc., the PSA forming the PSA layer is acrylic PSA that comprises an acrylic polymer as the base polymer. As used herein, the "base polymer" of a PSA refers to the primary component (typically a component accounting for greater than 50% by weight) among the polymers in the PSA. In the following, the present invention is described further in detail, referring to the embodiment wherein the PSA is acrylic PSA as a primary example; however, the PSA in the PSA sheet disclosed herein is not limited to acrylic PSA.

(Acrylic Polymer)

As the acrylic polymer, for instance, a preferable polymer is formed of monomer(s) comprising an alkyl (meth)acrylate as the primary monomer and possibly a secondary monomer copolymerizable with the primary monomer. The primary monomer herein refers to a component that accounts for more than 50% by weight of all the monomers in the starting monomer(s).

As the alkyl (meth)acrylate, for instance, can be preferably used a compound represented by the following formula (1):

$$CH_2=C(R^1)COOR^2 \quad (1)$$

Here, $R^1$ in the formula (1) is a hydrogen atom or a methyl group. $R^2$ is an acyclic alkyl group having 1 to 20 carbon atoms (such a range of the number of carbon atoms may be indicated as "$C_{1-20}$" hereinafter). From the standpoint of the storage elastic modulus of the PSA, etc., an alkyl (meth)acrylate with $R^2$ being a $C_{1-14}$ (e.g. $C_{2-10}$, typically $C_{4-8}$) acyclic alkyl group is preferable, and an alkyl (meth)acrylate with $R^1$ being a hydrogen atom and $R^2$ being a $C_{4-8}$ acyclic alkyl group is more preferable. The term "acyclic" here comprehensively means straight-chained and branched.

Examples of the alkyl (meth)acrylate wherein $R^2$ is a $C_{1-20}$ acyclic alkyl group include methyl (meth)acrylate, ethyl (meth)acrylate, propyl (meth)acrylate, isopropyl (meth)acrylate, n-butyl (meth)acrylate, isobutyl (meth)acrylate, s-butyl (meth)acrylate, pentyl (meth)acrylate, isopentyl (meth)acrylate, hexyl (meth)acrylate, heptyl (meth)acrylate, 2-ethylhexyl (meth)acrylate, octyl (meth)acrylate, isooctyl (meth)acrylate, nonyl (meth)acrylate, isononyl (meth)acrylate, decyl (meth)acrylate, isodecyl (meth)acrylate, undecyl (meth)acrylate, lauryl (meth)acrylate, tridecyl (meth)acrylate, tetradecyl (meth)acrylate, pentadecyl (meth)acrylate, hexadecyl (meth)acrylate, heptadecyl (meth)acrylate, octadecyl (meth)acrylate, isostearyl (meth)acrylate, nonadecyl (meth)acrylate and eicosyl (meth)acrylate. These alkyl (meth)acrylates may be used singly as one species or in a combination of two or more species. Preferable alkyl (meth)acrylates include n-butyl acrylate (BA) and 2-ethylhexyl acrylate (2EHA).

The alkyl (meth)acrylate content in the total monomer content used in synthesizing the acrylic polymer is preferably 70% by weight or greater, more preferably 85% by weight or greater, or yet more preferably 90% by weight or greater. The upper limit of alkyl (meth)acrylate content is not particularly limited. It is usually preferably 99.5% by weight or less (e.g. 99% by weight or less). Alternatively, the acrylic polymer may be essentially formed of just an alkyl (meth)acrylate. When a $C_{4-8}$ alkyl acrylate is used as a monomer, the $C_{4-8}$ alkyl acrylate content is usually suitably 50% by weight or more, preferably 70% by weight or more, more preferably 90% by weight or more, or yet more preferably 95% by weight or more (typically 99 to 100% by weight) of the alkyl (meth)acrylate content in the monomers.

A favorable example of the acrylic polymer is an acrylic polymer in which BA accounts for 50% by weight or more (typically, more than 50% by weight, e.g. 60% by weight or more) of the total monomer content. The total monomer content may further include 2EHA in a smaller proportion than BA. Another favorable example of the acrylic polymer is an acrylic polymer in which 2EHA accounts for 50% by weight or more (typically, more than 50% by weight, e.g. 60% by weight or more) of the total monomer content. The total monomer content may further include BA in a smaller proportion than 2EHA.

In the acrylic polymer in the art disclosed herein, other monomers may be copolymerized besides those described above as long as the effects of this invention are not impaired. The other monomers can be used for purposes such as adjusting the glass transition temperature (Tg) of the acrylic polymer and adjusting the adhesive properties. Examples of a monomer capable of increasing the cohesive strength and heat resistance of PSA include sulfonate group-containing monomers, phosphate group-containing monomers, cyano group-containing monomers, vinyl esters, and aromatic vinyl compounds. Favorable examples among these include vinyl esters. Specific examples of vinyl esters include vinyl acetate (VAc), vinyl propionate and vinyl laurate. VAc is particularly preferable.

The other monomers capable of introducing a functional group as a possible crosslinking site into the acrylic polymer or of contributing to an increase in adhesive strength include hydroxy (OH) group-containing monomers, carboxy group-containing monomers, acid anhydride group-containing monomers, amide group-containing monomers, amino group-containing monomers, imide group-containing monomers, epoxy group-containing monomers, (meth)acryloylmorpholine, and vinyl ethers.

In a favorable acrylic polymer in the art disclosed herein, a carboxy group-containing monomer is copolymerized as the other monomer. Examples of the carboxy group-containing monomer include acrylic acid (AA), methacrylic acid (MAA), carboxyethyl (meth)acrylate, carboxypentyl (meth)acrylate, itaconic acid, maleic acid, fumaric acid, crotonic acid, and isocrotonic acid. Preferable carboxy group-containing monomers include AA and MAA.

Other favorable examples of the acrylic polymer in the art disclosed herein include an acrylic polymer in which a hydroxy group-containing monomer is copolymerized as the other monomer. Examples of the hydroxy group-containing monomer include hydroxyalkyl (meth)acrylates such as 2-hydroxyethyl (meth)acrylate, 2-hydroxypropyl (meth)acrylate, 3-hydroxypropyl (meth)acrylate, 2-hydroxybutyl (meth)acrylate, and 4-hydroxybutyl (meth)acrylate; polypropylene glycol mono(meth)acrylate; and N-hydroxyethyl (meth)acrylamide. Particularly preferable hydroxy group-containing monomers include a straight-chained hydroxyalkyl (meth)acrylate having an acyclic alkyl group with 2 to 4 carbon atoms. Specific examples of the hydroxyalkyl (meth)acrylate include 2-hydroxyethyl acrylate (HEA) and 4-hydroxybutyl acrylate (4HBA).

The "other monomers" can be used singly as one species or in a combination of two or more species. The total amount of the other monomers is not particularly limited. For instance, it can be about 40% by weight or less (typically, 0.001% to 40% by weight) of the total monomer content, or usually more preferably about 30% by weight or less (typically, 0.01% to 30%, e.g. 0.1% to 10%, by weight).

While no particularly limitations are imposed, when a carboxy group-containing monomer is used as the other monomer, its amount is suitably about 0.1% to 10% (e.g. 0.2% to 8%, typically 0.5% to 5%) by weight of the total monomer content.

While no particularly limitations are imposed, when a hydroxy group-containing monomer is used as the other monomer, its amount is suitably about 0.001% to 10% (e.g. 0.01% to 5%, typically 0.02% to 2%) by weight of the total monomer content. In some embodiments, of the total monomer content, the hydroxy group-containing monomer content can be about 0.05% by weight or higher, higher than 0.05% by weight, or even about 0.07% by weight or higher. The art disclosed herein can be preferably implemented in an embodiment where the hydroxy group-containing monomer content is about 0.07% by weight or more and 1% by weight or less of the total monomer content.

The Tg of the base polymer is not particularly limited. It can be, for instance, −80° C. or higher. From the standpoint of increasing the deformability of the PSA layer in shear direction, the base polymer (favorably an acrylic polymer) of the PSA disclosed herein is suitably designed so that it has a Tg of about −15° C. or lower. In some embodiments, the Tg of the base polymer can be, for instance, about −25° C. or lower, about −40° C. or lower, or even about −50° C. or lower. From the standpoint of increasing the cohesion and shape recovery, the base polymer is suitably designed to have a Tg of about −70° C. or higher (preferably −65° C. or higher, e.g. −60° C. or higher).

Here, the Tg of the acrylic polymer refers to a value determined by the Fox equation based on the Tg values of homopolymers of the respective monomers constituting the polymer and weight fractions (copolymerization ratio by weight) of the monomers. As shown below, the Fox equation is a relational expression of the Tg of a copolymer and the glass transition temperatures Tgi of the homopolymers obtained by homopolymerization of the monomers constituting the copolymer.

$$1/Tg = \Sigma(Wi/Tgi)$$

In the Fox equation, Tg represents the glass transition temperature (unit: K) of the copolymer, Wi the weight fraction (copolymerization ratio by weight) of a monomer i in the copolymer, and Tgi the glass transition temperature (unit: K) of the homopolymer of the monomer i. As the Tg values of homopolymers, values given in a known document are used.

As the Tg values of the homopolymers, the following values are used with respect to the monomers shown next:

2-ethylhexyl acrylate −70° C.
n-butyl acrylate −55° C.
acrylic acid 106° C.
2-hydroxyethyl acrylate −15° C.
4-hydroxybutyl acrylate −40° C.

With respect to monomers other than those listed above, for the Tg values of the corresponding homopolymers, values given in "Polymer Handbook" (3rd edition, John Wiley & Sons, Inc., Year 1989) are used. When two or more values are listed in Polymer Handbook, the conventional value is used. With respect to monomers not listed in Polymer Handbook, catalogue values provided by monomer manufacturers are used. As the Tg value of homopolymer of a monomer that is not found in Polymer Handbook or not provided with a catalogue value, the value obtained by the measurement method described in Japanese Patent Application Publication No. 2007-51271 is used.

The method for obtaining the acrylic polymer is not particularly limited. Various polymerization methods known as synthetic means for acrylic polymers can be suitably employed, with the methods including a solution polymerization method, emulsion polymerization method, bulk polymerization method, suspension polymerization method, etc. For instance, a solution polymerization method can be preferably used. As the method for supplying monomers when carrying out solution polymerization, can be suitably employed an all-at-once supply method to supply all monomers at once, continuous (dropwise) supply method, portionwise (dropwise) supply method, etc. The polymerization temperature can be suitably selected depending on the types of monomers and solvent being used, type of polymerization initiator, etc. For example, it can be about 20° C. or higher (typically 40° C. or higher). The polymerization temperature can be, for instance, about 170° C. or lower (typically 140° C. or lower). Alternatively, photopolymerization carried out by irradiating light such as UV light (typically in the presence of a photopolymerization initiator) or active energy ray polymerization carried out by irradiating radioactive rays such as β rays and γ rays can be employed.

The solvent (polymerization solvent) used for solution polymerization can be suitably selected among heretofore known organic solvents. For instance, aromatic compounds (typically aromatic hydrocarbons) such as toluene, acetic acid esters such as ethyl acetate, and aliphatic or alicyclic hydrocarbons such hexane and cyclohexane are preferably used.

The initiator used for the polymerization can be suitably selected from heretofore known polymerization initiators in accordance with the type of polymerization method. For instance, one, two or more species of azo-based polymerization initiator, such as 2,2'-azobisisobutylonitrile (AIBN), etc., can be preferably used. Other examples of the polymerization initiator include persulfate salts such as potassium persulfate, etc.; peroxide-based initiators such as benzoyl peroxide, hydrogen peroxide, etc.; substituted ethane-based initiators such as phenyl-substituted ethane, etc.; aromatic carbonyl compounds; and so on. Yet other examples of the polymerization initiator include a redox-based initiator by a combination of a peroxide and a reducing agent. These polymerization initiators can be used singly as one species or in a combination of two or more species. The polymerization initiator can be used in a typical amount, selected from a range of, for instance, from about 0.005 part to about 1 part by weight (typically from about 0.01 part to about 1 part by weight) to 100 parts by weight of the total monomer content.

In the art disclosed herein, the Mw of the acrylic polymer is not particularly limited. For instance, it can be in a range of $10 \times 10^4$ to $500 \times 10^4$. From the standpoint of combining tack and peel resistance under constant load, the Mw of the base polymer is preferably in a range of $10 \times 10^4$ to $150 \times 10^4$ (e.g. $20 \times 10^4$ to $75 \times 10^4$, typically $35 \times 10^4$ to $65 \times 10^4$). The Mw herein refers to the value based on standard polystyrene determined by GPC (gel permeation chromatography). As the GPC system, for instance, model name "HLC-8320 GPC" (column: TSK gel GMH-H(S) available from Tosoh Corporation) can be used. The same applies to the polymers used in Examples described later.

(Tackifier)

The PSA layer disclosed herein may have a composition comprising a tackifier. The tackifier resin is not particularly limited. Various tackifier resins can be used, for instance, a rosin-based tackifier resin, terpene-based tackifier resin, hydrocarbon-based tackifier resin, epoxy-based tackifier resin, polyamide-based tackifier resin, elastomeric tackifier resin, phenol-based tackifier resin, ketone-based tackifier resin, etc. These tackifier resins can be used singly as one species or in a combination of two or more species.

Specific examples of the rosin-based tackifier resin include unmodified rosins (raw rosins) such as gum rosin, wood rosin, tall-oil rosin, etc.; modified rosins (hydrogenated rosins, disproportionated rosins, polymerized rosins, other chemically-modified rosins, etc., and the same applies hereinafter) obtainable from these unmodified rosins via modifications such as hydrogenation, disproportionation, polymerization, etc.; various other rosin derivatives; and the like. Examples of the rosin derivatives include rosin esters such as unmodified rosins esterified with alcohols (i.e., esterification products of unmodified rosins), modified rosins esterified with alcohols (i.e., esterification products of modified rosins), and the like; unsaturated fatty acid-modified rosins such as unmodified rosins and modified rosins modified with unsaturated fatty acids; unsaturated fatty acid-modified rosin esters such as rosin esters modified with unsaturated fatty acids; rosin alcohols from the reductive treatment of a carboxyl group in unmodified rosins, modified rosins, unsaturated fatty acid-modified rosins or unsaturated fatty acid-modified rosin esters; metal salts of rosins (in particular, of rosin esters) such as unmodified rosins, modified rosins, various rosin derivatives, etc.; rosin phenol resins obtainable from the addition of phenol to rosins (unmodified rosin, modified rosin, various rosin derivatives, etc.) by heat polymerization in the presence of an acid catalyst; and so on.

Although no particular limitations are imposed, specific examples of rosin esters include an ester of an unmodified rosin or a modified rosin (hydrogenated rosin, disproportionated rosin, polymerized rosin, etc.), for instance, methyl ester, triethylene glycol ester, glycerin ester, and pentaerythritol ester.

Examples of terpene-based tackifier resins include terpene resins such as α-pinene polymer, β-pinene polymer, and dipentene polymer; and modified terpene resins obtained by modification (phenol modification, aromatic group modification, hydrogenation, hydrocarbonization, etc.) of these terpene resins. A favorable example of the modified terpene resin is terpene-phenol resin.

Examples of hydrocarbon-based tackifier resins include various hydrocarbon-based resins such as aliphatic (C5-based) petroleum resins, aromatic (C9-based) petroleum resins, aliphatic/aromatic copolymer (C5/C9-based) petroleum resins, hydrogenated products of these (e.g. alicyclic petroleum resins obtainable by hydrogenating aromatic petroleum resins), various modified products (e.g. maleic acid anhydride-modified products) of these, coumarone-based resins, and coumarone-indene-based resins.

The amount of tackifier resin used is not particularly limited. It can be suitably set so that desirable effects can be obtained with its use. In some embodiments, the amount of tackifier resin used to 100 parts by weight of the base polymer can be, for instance, about 5 parts by weight or greater; or it can also be about 10 parts by weight or greater, about 15 parts by weight or greater, about 20 parts by weight or greater, or even about 25 parts by weight or greater. The amount of tackifier resin used to 100 parts by weight of the base polymer can be, for instance, about 70 parts by weight or less; or it can also be about 60 parts by weight or less, about 50 parts by weight or less, about 45 parts by weight or less, about 40 parts by weight or less, or even about 35 parts by weight or less.

In some embodiments, the tackifier resin preferably includes a tackifier resin $T_L$ having a softening point less than 105° C. The tackifier resin $T_L$ may effectively contribute to an increase in deformability in planar direction (shear direction) of the PSA layer. From the standpoint of more effectively increasing the deformability, the softening point of the tackifier resin used as the tackifier resin $T_L$ can be, for instance, about 103° C. or lower, about 100° C. or lower, about 95° C. or lower, about 90° C. or lower, or even about 85° C. or lower. The minimum softening point of the tackifier resin $T_L$ is not particularly limited. In some embodiments, from the standpoint of favorably combining deformability and suitable cohesive strength, the softening point of the tackifier resin $T_L$ can be, for instance, about 50° C. or higher, about 60° C. or higher, about 65° C. or higher, or even about 70° C. or higher.

The amount of tackifier resin $T_L$ used is not particularly limited. For instance, to 100 parts by weight of the base polymer, it can be about 5 parts by weight or greater and about 50 parts by weight or less. In some embodiments, the amount of tackifier resin $T_L$ used to 100 parts by weight of the base polymer can be, for instance, about 10 parts by weight or greater. From the standpoint of obtaining greater effects of its use, it can also be about 15 parts by weight or greater, about 20 parts by weight or greater, or even about 25 parts by weight or greater. From the standpoint of combining well-balanced deformability and cohesion in the PSA layer, in some embodiments, the amount of tackifier resin $T_L$ used to 100 parts by weight of the base polymer can be, for instance, about 45 parts by weight or less; or it can also be about 40 parts by weight or less, about 35 parts by weight or less, or even about 32 parts by weight or less.

As the tackifier resin $T_L$, solely one species or a combination of two or more species can be suitably selected and used from those having softening points below 105° C. among the examples of tackifier resin listed earlier. In some embodiments, the tackifier resin $T_L$ preferably includes a rosin-based resin. The tackifier resin $T_L$ may include solely one species of rosin-based resin or a combination of two or more species of rosin-based resin.

Examples of rosin-based resins that can be preferably used as the tackifier resin $T_L$ include, but are not particularly limited to, rosin esters such as unmodified rosin esters and modified rosin esters. Favorable examples of modified rosin esters include hydrogenated rosin esters. For instance, esters of unmodified rosins or modified rosins (e.g. hydrogenated rosins) can be used as the tackifier resin $T_L$, for example, rosin esters such as methyl esters and glycerin esters.

In the PSA layer according to a preferable embodiment, the tackifier resin $T_L$ comprises a hydrogenated rosin ester. As the hydrogenated rosin ester, a species having a softening point of lower than 105° C. can be used. A preferable species has a softening point of about 100° C. or lower (typically lower than 100° C., more preferably about 90° C. or lower, e.g. about 85° C. or lower). The minimum softening point of the hydrogenated rosin ester is not particularly limited. For easier achievement of good deformability and suitable cohesion, in some embodiments, the softening point of the hydrogenated rosin ester can be, for instance, about 50° C. or higher, about 60° C. or higher, about 70° C. or higher, or even about 75° C. or higher.

The tackifier resin $T_L$ may comprise a non-hydrogenated rosin ester. The non-hydrogenated rosin ester herein is a concept that comprehensively encompasses the aforementioned rosin esters excluding hydrogenated rosin esters. Examples of the non-hydrogenated rosin ester include unmodified rosin esters, disproportionated rosin esters and polymerized rosin esters. As the non-hydrogenated rosin ester, a species having a softening point of lower than 105° C. (e.g. about 100° C. or lower) can be suitably selected and used. The minimum softening point of the non-hydrogenated rosin ester is not particularly limited. For easy achievement of good deformability and suitable cohesion, in some embodiments, the softening point of the non-hydrogenated rosin ester can be, for instance, about 50° C. or higher, about 60° C. or higher, about 70° C. or higher, or even about 75° C. or higher.

As the rosin ester, the tackifier resin $T_L$ may comprise a hydrogenated rosin ester and a non-hydrogenated rosin ester together; may consist of one, two or more species of hydrogenated rosin ester; alternatively, may consist of one, two or more species of non-hydrogenated rosin ester. The PSA layer according to a preferable embodiment consists of, as the rosin ester in the tackifier resin $T_L$, one, two or more species of hydrogenated rosin ester.

The tackifier resin $T_L$ may include other tackifier resin in addition to the rosin-based resin. As the tackifier resin, solely one species or a combination of two or more species can be suitably selected and used from those having softening points below 105° C. among the examples of tackifier resin listed earlier. The tackifier resin $T_L$ may comprise, for instance, a rosin-based resin and a terpene-based resin.

In some embodiments, the rosin-based resin content in all the tackifier resin $T_L$ can be, for instance, higher than about 50% by weight; it can also be about 65% by weight or higher, or even about 75% by weight or higher. The art disclosed herein can be preferably implemented in an embodiment where essentially all (e.g. about 97% by weight or higher, 99% by weight or higher, or even 100% by weight) of the tackifier resin $T_L$ is a rosin-based resin.

In some embodiments, the PSA layer may comprise a tackifier resin $T_L$ and a tackifier resin $T_H$ having a softening point of 105° C. or higher (typically 105° C. or higher and 170° C. or lower) together. As the tackifier resin $T_H$, solely one species or a combination of two or more species can be suitably selected and used from those having softening points of 105° C. or higher among the examples of tackifier resin listed earlier. In some embodiments, the tackifier resin $T_H$ may comprise one, two or more species selected from the group consisting of rosin-based tackifier resins (e.g. rosin esters) and terpene-based tackifier resins (e.g. terpene-phenol resin).

The ratio of the tackifier resin $T_L$ in the amount of the tackifier resin used can be, for instance, higher than 10% by weight, higher than 20% by weight, or even higher than 25% by weight. In some embodiments, the tackifier resin $T_L$ content of the tackifier resin can be, for instance, about 30% by weight or higher; it is preferably about 50% by weight or higher, or more preferably about 70% by weight or higher. The tackifier resin $T_L$ content of the tackifier resin can be, for instance, 85% by weight or higher, 90% by weight or higher, or even 95% by weight or higher. As the tackifier resin, one, two or more species of tackifier resin $T_L$ can be used alone.

The softening point of a tackifier resin referred to herein is defined as a value measured based on the softening point test method (ring and ball method) specified in JIS K5902 and JIS K2207. In particular, a sample is quickly melted at a lowest possible temperature, and with caution to avoid bubble formation, the melted sample is poured into a ring to the top, with the ring being placed on top of a flat metal plate. After cooled, any portion of the sample risen above the plane including the upper rim of the ring is sliced off with a small knife that has been somewhat heated. Following this, a support (ring support) is placed in a glass container (heating bath) having a diameter of 85 mm or larger and a height of 127 mm or larger, and glycerin is poured into this to a depth of 90 mm or deeper. Then, a steel ball (9.5 mm diameter, weighing 3.5 g) and the ring filled with the sample are immersed in the glycerin while preventing them from touching one another; and the temperature of glycerin is maintained at 20° C.±5° C. for 15 minutes. The steel ball is then placed at the center of the surface of the sample in the ring, and this is placed on a prescribed location of the support. While keeping the distance between the ring top and the glycerin surface at 50 mm, a thermometer is placed so that the center of the mercury ball of the thermometer is as high as the center of the ring, and the container is heated evenly by projecting a Bunsen burner flame at the midpoint between the center and the rim of the bottom of the container. After the temperature has reached 40° C. from the start of heating, the rate of the bath temperature rise must be kept at 5° C.±0.5° C. per minute. As the sample gradually softens, the temperature at which the sample flows out of the ring and finally touches the bottom plate is read as the softening point. Two or more measurements of softening point are performed at the same time, and their average value is used.

(Crosslinking Agent)

The PSA layer can include a crosslinking agent. The use of the crosslinking agent can provide the PSA layer with suitable cohesive strength. The crosslinking agent may be useful in adjusting the displacement and the distance returned in the holding power test. The crosslinking agent-containing PSA layer can be obtained, for instance, by forming the PSA layer using a PSA composition that comprises the crosslinking agent. The crosslinking agent may be included in the PSA layer in a crosslinked state, a non-crosslinked state, a partially crosslinked state, an intermediate or composite state of these, etc. In typical, the crosslinking agent is mostly included in a crosslinked state.

If used, the amount of the crosslinking agent used to 100 parts by weight of the base polymer can be, for instance, in a range between 0.005 parts by weight or greater and 10 parts by weight or less. The crosslinking agent content is more preferably 0.01 parts by weight or greater and 7 parts by weight or less, or yet more preferably 0.02 parts by weight or greater and 5 parts by weight or less.

Examples of the crosslinking agent that can be used include an isocyanate-based crosslinking agent, epoxy-based crosslinking agent, silicone-based crosslinking agent, oxazoline-based crosslinking agent, aziridine-based crosslinking agent, silane-based crosslinking agent, alkyl etherified melamine-based crosslinking agent, metal chelate-based crosslinking agent, and a peroxide. Favorable examples of the crosslinking agent include an isocyanate-based crosslinking agent and an epoxy-based crosslinking agent. For the crosslinking agent, solely one species or a combination of two or more species can be used. From the standpoint of combining well-balanced deformability and cohesive strength in the PSA layer, in some embodiments, an isocyanate-based crosslinking agent is preferably used. For the isocyanate-based crosslinking agent, solely one species or a combination of two or more species can be used. The isocyanate-based crosslinking agent can be used in combination with other crosslinking agent, for instance, an epoxy-based crosslinking agent.

As the isocyanate-based crosslinking agent, a compound having at least two isocyanate groups per molecule can be used. The isocyanate groups include an isocyanate-forming functional group in which the isocyanate groups are temporarily protected by a blocking agent, through multimarization, etc. Examples of the isocyanate-based crosslinking agent include aromatic isocyanates such as tolylene diisocyanate and xylene diisocyanate, alicyclic isocyanates such as isophorone diisocyanate, and aliphatic isocyanates such as hexamethylene diisocyanate.

More specifically, examples of the isocyanate crosslinking agent include lower aliphatic polyisocyanates such as butylene diisocyanate and hexamethylene diisocyanate; alicyclic isocyanates such as cyclopentylene diisocyanate, cyclohexylene diisocyanate, and isophorone diisocyanate; aromatic diisocyanates such as 2,4-tolylene diisocyanate, 4,4'-diphenylmethane diisocyanate, xylylene diisocyanate, and polymethylene polyphenyl isocyanate; isocyanate adducts such as trimethylolpropane-tolylene diisocyanate trimer adduct (available from Tosoh Corporation, product name CORONATE L), a trimethylolpropane-hexamethylene diisocyanate trimer adduct (available from Tosoh Corporation, product name CORONATE HL), and isocyanurate of hexamethylene diisocyanate (available from Tosoh Corporation, product name CORONATE HX); trimethylolpropane adduct of xylylene diisocyanate (available from Mitsui Chemicals, Inc., product name TAKENATE D110N), trimethylolpropane adduct of xylylene diisocyanate (available from Mitsui Chemicals, Inc., product name TAKENATE D120N), trimethylolpropane adduct of isophorone diisocyanate (available from Mitsui Chemicals, Inc., product name TAKENATE D140N), and trimethylolpropane adduct of hexamethylene diisocyanate (available from Mitsui Chemicals, Inc., product name TAKENATE D160N); polyether polyisocyanate and polyester polyisocyanate; adducts of these and various polyols; and polyisocyanates polyfunctionalized with an isocyanurate bond, a biuret bond, an allophanate bond, etc. Among these, aromatic isocyanates and alicyclic isocyanates are preferably used to obtain a PSA layer that combines well-balanced deformability and cohesive strength.

The amount of the isocyanate crosslinking agent used to 100 parts by weight of the base polymer can be, for instance, about 0.1 parts by weight or greater, about 0.5 parts by weight or greater, about 1.0 parts by weight or greater, or even greater than 1.5 parts by weight. From the standpoint of obtaining greater effects of its use, in the PSA layer according to some embodiments, the amount of the isocyanate crosslinking agent used to 100 parts by weight of the base polymer can be, for instance, about 2.5 parts by weight or greater, greater than 2.5 parts by weight, or even about 2.7 parts by weight or greater. The amount of the isocyanate crosslinking agent used to 100 parts by weight of the base polymer can be, for instance, 10 parts by weight or less, 7 parts by weight or less, or even 5 parts by weight or less.

In some embodiments where the monomer(s) forming the base polymer (typically an acrylic polymer) comprise a hydroxy group-containing monomer, the weight ratio of the isocyanate crosslinking agent to the hydroxy group-containing monomer can be, for instance, greater than 20, about 22 or greater, about 25 or greater, or even about 27 or greater. The weight ratio of the isocyanate crosslinking agent to the hydroxy group-containing monomer can be, for instance, less than 50, about 45 or less, about 40 or less, or even about 35 or less. With the PSA layer having such a composition, the PSA sheet can be favorably obtained with great flexproof properties.

In some embodiments where the PSA layer comprises a tackifier resin $T_L$ having a softening point below 105° C., the weight ratio of the tackifier resin $T_L$ to the isocyanate-based crosslinking agent can be, for instance, higher than 2, about 5 or higher, or even about 7 or higher. The weight ratio of the tackifier resin $T_L$ to the isocyanate-based crosslinking agent can be, for instance, lower than 15, or even lower than 12. With the PSA layer having such a composition, a PSA sheet with great flexproof properties can be favorably obtained.

As the epoxy-based crosslinking agent, a polyfunctional epoxy compound having at least two epoxy groups per molecule can be used. Examples of the epoxy-based crosslinking agent include N,N,N',N'-tetraglycidyl-m-xylenediamine, diglycidylaniline, 1,3-bis(N,N-diglycidylaminomethyl)cyclohexane, 1,6-hexanediol diglycidyl ether, neopentyl glycol diglycidyl ether, ethylene glycol diglycidyl ether, propylene glycol diglycidyl ether, polyethylene glycol diglycidyl ether, polypropylene glycol diglycidyl ether, sorbitol polyglycidyl ether, glycerol polyglycidyl ether, pentaerythritol polyglycidyl ether, polyglycerol polyglycidyl ether, sorbitan polyglycidyl ether, trimethylolpropane polyglycidyl ether, adipic acid diglycidyl ester, o-phthalic acid diglycidyl ester, triglycidyl-tris(2-hydroxyethyl) isocyanurate, resorcine diglycidyl ether, bisphenol-S-diglycidyl ether and an epoxy resin having at least two epoxy groups per molecule. Examples of commercial epoxy-based crosslinking agents include TETRAD C and TETRAD X available from Mitsubishi Gas Chemical, Inc.

For the epoxy-based crosslinking agent, solely one species or a combination of two or more species can be used. The amount of the epoxy-based crosslinking agent used to 100 parts by weight of the acrylic polymer can be, for instance, about 0.005 part to 1 part by weight, 0.01 part to 0.5 part by weight, or even 0.015 part to 0.3 part by weight.
(Other Components)

The PSA layer may include, as necessary, various additives generally used in the PSA field, such as leveling agent, crosslink aid, plasticizer, softener, filler, anti-static agent, anti-aging agent, UV absorber, antioxidant, and photostabilizer. With respect to these various additives, heretofore known species can be used by typical methods. Because they do not particularly characterize this invention, details are omitted.

In some embodiments, the PSA layer disclosed herein may have a composition in which the total amount of the base polymer, tackifier resin used as necessary and crosslinking agent used as necessary accounts for about 90% by weight or more of the PSA layer. The total amount of the base polymer, tackifier resin and crosslinking agent can be, for instance, about 95% by weight or more, or even about 97% by weight or more of the PSA layer. With the PSA layer having such a composition, good deformability is likely to be combined with suitable cohesive strength.

<Substrate>

The PSA sheet disclosed herein can be made, for instance, as a PSA sheet with substrate as shown in FIGS. 1 and 2. As the substrate, for instance, woven fabric film, non-woven fabric film and resin film can be used. In particular, resin film is preferable. The resin film may be non-foam resin film, rubber-like film, foam film, etc.

In some embodiments, resin film can be preferably used as the substrate. As used herein, the term "resin film" refers to essentially non-porous film and is conceptually distinctive from so-called non-woven fabric and woven fabric (i.e. the concept excludes non-woven fabric and woven fabric). In addition, the non-foam resin film refers to resin film that has not been intentionally subjected to a foaming process. Specifically, the non-foam resin film may have an expansion rate below about 1.1-fold (e.g. below 1.05-fold, typically below 1.01-fold). Examples of the non-foam resin include soft resin film such as soft polyolefine, soft polyurethane, soft polyester, and soft polyvinyl chloride.

Preferable examples of the resin material constituting the resin film disclosed herein include polyurethanes such as ether-based polyurethane, ester-based polyurethane, carbonate-based polyurethane, etc.; urethane (meth)acrylate-based polymers; polyolefins such as PE, PP, ethylene-propylene copolymer, ethylene-butene copolymer, etc.; polyesters such as polyethylene terephthalate (PET), polybutylene terephthalate (PBT), polyethylene naphthalate, polybutylene naphthalate, etc.; and polycarbonates. As the polyester, PBT, polyethylene naphthalate and polybutylene naphthalate are more preferable. The resin material can be: styrene-based copolymer (typically styrene-based elastomer) such as styrene-butadiene copolymer, styrene-isoprene copolymer, styrene-ethylene-butylene copolymer, styrene-ethylene-propylene copolymer, styrene-butadiene-styrene copolymer, styrene-isoprene-styrene copolymer, etc.; acrylic copolymer called acrylic rubber; or polyvinyl chloride (PVC)-based resin such as soft polyvinyl chloride. The resin materials can be used singly as one species or in a combination of two or more species. The concept of the resin material encompasses species generally called rubber and thermoplastic elastomer.
(Polyurethane-Based Resin Film)

In a preferable embodiment, the substrate is a polyurethane-based resin film. Herein, the polyurethane-based resin film refers to resin film comprising polyurethane as the primary component (a component at the highest proportion, typically a component accounting for greater than 50% by weight) among resin components. The polyurethane-based resin film is typically formed of a material that does not substantially show a yield point and is a film material that is likely to form a PSA sheet that exhibits preferable properties disclosed herein (one, two or more properties among the recovery rate, maximum tensile strength, and elongation at break). The polyurethane-based resin film can also realize great physical properties without addition of additive(s) such as plasticizer, etc. Thus, it can be a preferable substrate in the art disclosed herein in view that it can exhibit stable properties while preventing bleed-out of the additive(s) and their diffusion into the PSA layer.

The proportion of polyurethane among the resin components in the polyurethane-based resin film is preferably 70% by weight or higher (e.g. 80% by weight or higher, typically 90% by weight or higher, and 100% by weight or lower). The polyurethane-based resin film disclosed herein may be a film formed of a polymer blend of a polyurethane and other resin. The other resin can be one, two or more species among an acrylic resin, polyolefin, polyester, polycarbonate and the like. Alternatively, the art disclosed herein can be implemented also in an embodiment using a substrate essentially free of other resin components besides polyurethane.

The polyurethane is a polymer synthesized by the polyaddition reaction of a polyol (e.g. a diol) and a polyisocyanate (e.g. diisocyanate) at a prescribed ratio. The NCO/OH ratio of the polyurethane can be suitably set based on technical common knowledge to a skilled person in the art so that desirable properties can be obtained in a PSA sheet using the polyurethane-based resin film as the substrate.

Examples of a polyol that can be used in synthesizing the polyurethane include diols such as ethylene glycol, propylene glycol, 1,3-propanediol, 1,4-butanediol, 1,5-pentanediol, neopentyl glycol, 1,6-hexanediol, 1,8-octanediol, polyoxytetramethylene glycol, diethylene glycol, polyethylene glycol, polypropylene glycol, etc.; polyester polyols which are polycondensates of the diols and dicarboxylic acids (e.g. adipic acid, azelaic acid, sebacic acid); carbonatediols such as polyalkylene carbonate diols, etc.; and the like. These can be used singly as one species or in a combination of two or more species.

The polyisocyanate that can be used in synthesizing the polyurethane includes an aromatic, aliphatic and alicyclic diisocyanate as well as their multimers (e.g. dimers, trimers), etc. Examples of the diisocyanate include tolylene diisocyanate, diphenylmethane diisocyanate, hexamethylene diisocyanate, xylylene diisocyanate, hydrogenated xylylene diisocyanate, isophorone diisocyanate, hydrogenated diphenylmethane diisocyanate, 1,5-naphthylene diisocyanate, 1,3-phenylene diisocyanate, 1,4-phenylene diisocyanate, butane-1,4-diisocyanate, 2,2,4-trimethylhexamethylene diisocyanate, 2,4,4-trimethylhexamethylene diisocyanate, cyclohexane-1,4-diisocyanate, dicyclohexylmethane-4,4-diisocyanate, 1,3-bis(isocyanatemethyl)cyclohexane, methylcyclohexane diisocyanate, m-tetramethylxylylene diisocyanate, and the like. These can be used singly as one species or in a combination of two or more species. Among them, an aromatic diisocyanate is preferable.

The polyurethane may include other copolymerized component(s) in addition to the polyol and polyisocyanate. As the other copolymerized component(s), one, two or more species can be used among a monocarboxylic acid, dicarboxylic acid, trifunctional or higher polycarboxylic acid, hydroxycarboxylic acid, alkoxycarboxylic acid, their derivatives and the like. The proportion of these other copolymerized component(s) is suitably less than about 30% by weight (e.g. less than 10% by weight, typically less than 5% by weight) of the polyurethane. The art disclosed herein can be preferably implemented in an embodiment comprising a polyurethane-based resin film substrate comprising, as the primary component, a polyurethane free of other copolymerized components.

(Urethane (meth)acrylate Resin Film)

In another preferable embodiment, the substrate is resin film comprising a urethane (meth)acrylate-based polymer (i.e. urethane (meth)acrylate-based resin film). As the urethane (meth)acrylate-based polymer, a polymer comprising a structural moiety derived from a urethane (meth)acrylate can be used. Here, the urethane (meth)acrylate refers to a compound having a urethane bond and a (meth)acryloyl group in a molecule and such a compound can be used without particular limitations. For the urethane (meth)acrylate, solely one species or a combination of two or more species can be used. The urethane (meth)acrylate preferably has two or more urethane bonds as well as two or more (meth)acryloyl groups. The number of (meth)acryloyl groups in the urethane (meth)acrylate is preferably 2 to 5, or more preferably 2 to 3. For instance, a urethane (meth) acrylate having two (meth)acryloyl groups can be preferably used. The urethane (meth)acrylate is preferably a urethane acrylate. Here, the term "urethane acrylate" refers to a urethane (meth)acrylate in which the ratio by number of acryloyl groups exceeds 50% of the (meth)acryloyl groups contained therein.

As the urethane (meth)acrylate, various commercial urethane (meth)acrylates can be used. For instance, trade name UV-3300B available from Nippon Synthetic Chemical Industry Co., Ltd., and trade name BEAM SET 505A-6 available from Arakawa Chemical Industries, Ltd., can be preferably used.

(PVC-Based Resin Film)

In another preferable embodiment, the substrate is a PVC-based resin film. The PVC-based resin film is fabricated by forming (molding) film from a PVC-based resin composition (molding material) comprising a PVC-based resin. Here, the PVC-based resin composition refers to a resin composition in which a PVC-based resin (typically PVC) is the primary component (i.e. accounting for 50% by weight or more) among the resin components (polymers). The PVC-based resin preferably accounts for about 80% by weight or more (more preferably about 90% by weight or more) of the total resin content in the PVC-based resin composition. Essentially all of the resin content can be PVC. Such a PVC-based resin composition can form PVC-based resin film that exhibits favorable physical properties as the substrate of the PSA sheet disclosed herein.

(Elastomeric Resin Film)

In another preferable embodiment, the substrate is an elastomeric resin film. The elastomeric resin film refers to a resin film having an elastomer layer. The elastomer layer may include an arbitrary suitable resin as far as the effects of this invention are not impaired. Examples of the resin include olefinic elastomers and styrene-based elastomers. Preferably, the elastomer layer comprises an olefinic elastomer. With the inclusion of the olefinic elastomer in the elastomer layer, elastomeric resin film that shows physical properties favorable as the substrate of the PSA sheet disclosed herein can be formed.

The olefinic elastomer content in the elastomer layer is typically about 50% by weight or higher, or usually preferably about 60% by weight or higher (e.g. about 65% by weight or higher). In an embodiment, it can be about 70% by weight or higher, about 80% by weight or higher, about 90% by weight or higher, or even about 95% by weight or higher. Essentially 100% by weight of the elastomer layer can be an olefinic elastomer.

Specific examples of favorable olefinic elastomers include α-olefinic elastomers. Preferable α-olefinic elastomers include ethylenic elastomers, propylenic elastomers and 1-butenic elastomers. The ethylenic elastomer typically refers to a copolymer whose primary monomer is ethylene and it can be a copolymer in which the copolymerization ratio of ethylene is higher than 50% by weight. Similarly, the propylenic elastomer typically refers to a copolymer whose primary monomer is propylene and it can be a copolymer in which the copolymerization ratio of propylene is higher than 50% by weight. The same applies to other α-olefinic elastomers.

For the α-olefinic elastomer, a commercial product can be obtained as well. Examples of the commercial product include some of the TOUGHMER® series available from Mitsui Chemicals, Inc. (e.g. TOUGHMER PN-3560, etc.); and some of the VISTAMAXX® series available from Exxon Mobil Corporation (e.g. VISTAMAXX 6202, VISTAMAXX 7010, VISTAMAXX 3000, etc.). These can be used singly as one species or in a combination of two or more species.

The elastomer layer may comprise a non-elastomeric olefinic resin, that is, an olefinic resin that is not an elastomeric olefinic resin. For the non-elastomeric olefinic resin, a commercial product can be used as well. Non-limiting examples of the non-elastomeric olefinic resin include α-olefin homopolymer, a copolymer of two or more α-olefins, block polypropylene, random polypropylene, and a copolymer of one, two or more species of α-olefin and other vinyl monomer(s). Examples of the forms of copolymerization in the copolymers include block forms and random forms. Examples of the α-olefin homopolymer include PE, homopolypropylene, poly(1-butene), and poly(4-methyl-1-pentene). Examples of the copolymer of two or more species of α-olefin include ethylene/propylene copolymer, ethylene/1-butene copolymer, and ethylene/propylene/1-butene copolymer. Examples of the copolymer of one, two or more species of α-olefin and other vinyl monomer(s) include ethylene/vinyl acetate copolymer, ethylene/acrylic acid alkyl ester copolymer, ethylene/methacrylic acid alkyl ester copolymer and ethylene/non-conjugated diene copolymer.

(Foam Film)

In some embodiments, the substrate can be a foam film formed of foam of a plastic material (i.e. plastic foam). Specific examples of the plastic foam include polyolefinic resin foam; polyester-based resin foam; polyvinyl chloride-based resin foam; vinyl acetate-based resin foam; polyphenylene sulfide resin foam; amide-based resin foam such as aliphatic polyamide (Nylon) resin foam and aromatic polyamide (aramide) resin foam; polyimide-based resin foam; polyetheretherketone (PEEK) foam; styrene-based resin foam such as polystyrene foam; and urethane-based foam such as polyurethane resin foam. As the plastic foam, rubber-based resin foam such as polychloroprene rubber foam can also be used.

Examples of preferable foam include polyolefinic resin foam (or PO foam, hereinafter). As the plastic material (i.e. polyolefinic resin) forming the PO foam, known or commonly used various types of polyolefinic resin can be used without particular limitations. Examples include polyethylene such as low-density polyethylene (LDPE), linear low-density polyethylene (LLDPE), and high-density polyethylene (HDPE); polypropylene, ethylene-polypropylene copolymer, and ethylene-vinyl acetate copolymer. Examples of LLDPE include Ziegler-Natta catalyst-based linear low density polyethylene and metallocene-catalyst-based linear low density polyethylene. For the polyolefinic resin, solely one species or a suitable combination of two or more species can be used. In some embodiments, PO foam essentially formed of polyethylenic or polypropylenic resin foam can be preferably used. Here, the polyethylenic resin refers to a resin in which ethylene is the primary monomer (i.e. the primary component among its monomers). It may encompass HDPE, LDPE, and LLDPE as well as ethylene-propylene copolymer and ethylene-vinyl acetate copolymer in which the copolymerization ratio of ethylene is above 50% by weight. Similarly, the polypropylenic resin refers to a resin in which propylene is the primary monomer. Among them, polyethylenic foam is preferable.

The method for producing the polyolefinic foam is not particularly limited and various known methods can be suitably used. For instance, it can be produced by a method comprising a step of molding the corresponding polyolefin resin, a crosslinking step and a foaming step. It may also comprise an elongation step as necessary. Examples of the method for crosslinking polyolefinic foam include a chemical crosslinking method using an organic peroxide and an ionizing radiation crosslinking method. These methods can be used together. Examples of the ionizing radiation include electron rays, α rays, β rays and γ rays. The dose of the ionizing radiation is not particularly limited. It can be set to a radiation dose suitable in view of the target physical properties (e.g. degree of crosslinking, etc.) of the porous substrate.

The substrate may include, as necessary, various additives such as filler (inorganic filler, organic filler, etc.), colorant such as pigment and dye, anti-aging agent, antioxidant, UV (ultraviolet ray) absorber, anti-static agent, slip agent, plasticizer, flame retardant and surfactant.

Of the substrate, the surface to which the PSA layer is to be provided may be subjected, as necessary, to a heretofore known surface treatment such as corona discharge treatment, plasma treatment, UV irradiation, acid treatment, alkali treatment, primer coating (undercoating), and anti-static treatment. These surface treatments may increase the adhesion between the substrate and the PSA layer, that is, the anchoring of the PSA layer to the substrate. The composition of the primer is not particularly limited and can be suitably selected among known species. The coating thickness of the primer is not particularly limited and is usually suitably about 0.01 µm to 1 µm, or preferably about 0.1 µm to 1 µm.

The thickness of the substrate is not particularly limited. For instance, it can be in a range of about 10 µm to about 480 µm. In some embodiments, in view of the handling properties and ease of processing, the thickness of the substrate can be, for instance, about 25 µm or greater, about 40 µm or greater, or even about 80 µm or greater. When foam film is used as the substrate, the thickness of the substrate can be, for instance, about 50 µm or greater, about 100 µm or greater, about 200 µm or greater, about 300 µm or greater, or even about 450 µm or greater. In some other embodiments, the thickness of the substrate can be, for instance, about 280 µm or less, about 230 µm or less, about 180 µm or less, about 130 µm or less, about 80 µm or less, about 50 µm or less, or even about 40 µm or less. With decreasing thickness of the substrate, the thickness of the PSA sheet using the substrate can be reduced. With decreasing thickness of the PSA sheet, for instance, the difference in degree of deformation between the outside and the inside while bent will decrease, possibly enhancing the flexproof properties such as peel resistance.

The PSA sheet disclosed herein may be constituted, using a substrate having a thickness of about 20 µm or less.

When the PSA sheet is in an embodiment where the PSA layer is placed only on one face (front face) of the substrate, the reverse face (backside) of the substrate may be subjected as necessary to heretofore known surface treatment such as release treatment and anti-static treatment. For instance, by treating the backside surface of the substrate with a release agent (typically, by providing a release layer formed of a release agent), the unwinding force of the PSA sheet in a rolled form can be reduced. As the release agent, silicone-based release agent, long-chain alkyl release agent, olefinic release agent, fluorine-based release agent, aliphatic amide-based release agent and molybdenum sulfide, silica powder and the like can be used. To facilitate its layering, etc., the backside of the substrate can be subjected to treatment such as corona discharge treatment, plasma treatment, UV irradiation, acid treatment, and base treatment.

<Formation of PSA Sheet>

The PSA layer disclosed herein can be typically formed, using a PSA composition that includes the corresponding components. The PSA composition can be a PSA composition in a form (solvent-based form) comprising PSA (adhesive components) having a aforementioned composition in an organic solvent, a PSA composition in a form (water-dispersed form, typically an aqueous emulsion form) where PSA is dispersed in an aqueous solvent, a hot-melt PSA composition, and so on. From the standpoint of the ease of applying the PSA and the latitude in the choice of a substrate, etc., a solvent-based or water-dispersed PSA composition can be preferably used. From the standpoint of obtaining even greater adhesive properties, a solvent-based PSA composition is especially preferable. The solvent-based PSA composition can typically be prepared as a solution containing the respective components described above in an organic solvent. The organic solvent can be selected among known or conventional organic solvents. For instance, any one species or a mixture of two or more species can be preferably used among aromatic compounds (typically aromatic hydrocarbons) such as toluene; acetic acid esters such as ethyl acetate; aliphatic or alicyclic hydrocarbons such as hexane and cyclohexane.

As the method for obtaining a PSA sheet from the PSA composition, various heretofore known methods can be applied. For instance, a substrate-free PSA sheet can be obtained by applying the PSA composition to a suitable release face and allowing it to dry or cure. Examples of the method for obtaining a PSA sheet with substrate include a method (direct method) where the PSA composition is directly applied to a substrate and allowed to dry or cure to form a PSA layer and a method (transfer method) such that the PSA composition is applied to a suitable release face and allowed to dry or cure to form a PSA layer on the surface, and the PSA layer is transferred to a substrate. These methods can be combined.

The PSA composition can be applied with a known or commonly-used coater such as a gravure coater, reverse roll coater, kiss roll coater, dip roll coater, bar coater, knife coater, spray coater and the like. The PSA layer is typically formed continuously. Depending on the purpose and application, it may be formed in a regular or random pattern of dots, stripes, etc.

The thickness of the PSA layer is not particularly limited. For instance, the thickness can be about 5 µm to about 500 µm. Preferable thicknesses of the PSA layer may also vary depending on the form of the PSA sheet. When the PSA sheet includes a substrate, the thickness of the PSA layer (the thickness per face in a double-faced PSA sheet) can be, for instance, about 5 µm or greater. From the standpoint of increasing the adhesive strength, etc., it can be about 8 µm or greater, about 12 µm or greater, or even about 15 µm or greater. In view of reducing the thickness of the PSA sheet to decrease the difference in degree of deformation between the outside and the inside while bent, the thickness of the PSA sheet in the on-substrate PSA sheet is suitably, for instance, about 100 µm or less; it can be about 75 µm or less, about 60 µm or less, about 40 µm or less, or even about 25 µm or less. When the PSA sheet is free of a substrate, the thickness of the PSA layer is the same as the thickness of the PSA sheet. The thickness of the substrate-free PSA sheet can be, for instance, about 30 µm or greater, about 60 µm or greater, about 90 µm or greater, about 120 µm or greater, or about 150 µm or greater. The thickness of the substrate-free PSA sheet can be, for instance, about 250 µm or less, about 200 µm or less, about 150 µm or less, less than 120 µm, less than 90 µm, or even less than 60 µm.

While no particular limitations are imposed, the PSA layer may have a gel fraction of, about instance, about 5% to 60% by weight. To easily obtain both great deformability and suitable cohesion, in some embodiments, the gel fraction of the PSA layer can be, for instance, 10% to 50% by weight, or even 15% to 45% by weight. The gel fraction of the PSA layer can be adjusted, for instance, through the composition and molecular weight of the base polymer, the use of crosslinking agent and selection of its type and amount used if any, etc. The maximum gel fraction is theoretically 100% by weight.

The gel fraction of a PSA layer can be determined by wrapping a measurement sample weighing W1 with a porous tetrafluoroethylene resin sheet and suspending the resultant in ethyl acetate at room temperature for one week, subsequently drying the measurement sample, measuring the weight W2 of its ethyl acetate-insoluble portion, and substituting W1 and W2 into the next equation: gel fraction (%)=W2/W1×100. As the porous tetrafluoroethylene resin sheet, can be used trade name "NITOFURON® NTF1122" available from Nitto Denko Corporation.

While no particular limitations are imposed, the PSA sheet disclosed herein may show a 180° peel strength at 30 minutes after adhered of, for instance, preferably 3 N/20 mm or greater, more preferably 5 N/20 mm or greater, or yet more preferably 7 N/20 mm or greater when measured based on JIS Z 0237 (adherend: stainless steel plate (SUS304BA plate), sample width: 20 mm, measurement environment: 23° C. and 50% RH, press-bonding conditions: 2 kg roller moved back and forth once, tensile speed: 300 mm/min). When an adherend on which a PSA sheet is applied is briefly stored in a folded state and then unfolded (opened), the segment on the outside where folded tends to elongate. The PSA sheet with high 180° peel strength is preferable in view of preventing the PSA sheet from lifting (peeling) off the adherend partially (where the ridge was when folded) to cause wrinkling and lifting. The maximum 180° peel strength is not particularly limited. It can be, for instance, about 30 N/20 mm or less.

<Applications>

With its excellent flexproof properties, the PSA sheet disclosed herein can be preferably used in an embodiment where it is applied to a component of a device having a flexible element (e.g. flexible display). Examples of the device include various portable devices. Here, being portable means not just providing simple mobility, but further providing a level of portability that allows an individual (average adult) to carry it relatively easily. Examples of the portable devices referred to herein include portable electronic devices such as mobile phones, smartphones, tablet PCs, notebook PCs, wrist and pocket watches, various wearable devices, acoustic equipment (mobile music players, IC recorders, etc.), calculators (pocket calculators), handheld game devices, electronic dictionaries, electronic notebooks, electronic books, electronic paper, vehicle navigation systems, portable TVs, and lighting equipment. Examples of components forming the portable electronic devices include optical film and display panels used in image display units such as liquid crystal displays and organic EL displays. In a portable electronic device (in general, possibly a so-called flexible device or foldable device), the PSA sheet disclosed herein can be preferably used for purposes such as fixing, bonding, sealing, molding, protecting, separating, cushioning, etc., of components constituting the device.

Matters disclosed in this description include the following:

(1) A PSA sheet comprising a PSA layer, wherein
the PSA sheet has a recovery rate at 100% elongation of 70% or higher, and
the PSA layer shows a displacement of 0.5 mm or greater in the following holding power test:

<Holding Power Test>

At 23° C., the PSA layer is applied over a 10 mm wide by 20 mm long bonding area to a Bakelite plate as an adherend; a 1 kg load is applied in the length direction; after one hour, the displacement from the initial point where first applied is determined.

(2) The PSA sheet according to (1), showing a maximum tensile strength at 100% elongation of 15 N/10 mm or less.

(3) The PSA sheet according to (1) or (2) above, having a thickness of 250 µm or less.

(4) The PSA sheet according to any of (1) to (3) above, wherein the PSA layer is formed of a PSA comprising a base polymer and a tackifier resin.

(5) The PSA sheet according to (4) above, wherein the tackifier resin comprises a tackifier resin $T_L$ having a softening point of 50° C. or higher and lower than 105° C., and the tackifier resin $T_L$ content in the PSA layer is greater than 10 parts by weight to 100 parts by weight of the base polymer.

(6) The PSA sheet according to any of (1) to (5) above, wherein the base polymer of the PSA forming the PSA layer is an acrylic polymer.

(7) The PSA sheet according to any of (1) to (6) above, wherein the PSA layer comprises a crosslinking agent.

(8) The PSA sheet according to (1) to (7) above, wherein the PSA layer shows a distance returned of 0.05 mm or greater at 5 minutes after the load is removed in the holding power test.

(9) The PSA sheet according to any of (1) to (8) above, comprising a substrate and the PSA layer provided at least on one face of the substrate.

(10) The PSA sheet according to (9), wherein the substrate is a stretchable substrate comprising, as its primary component, a resin selected from the group consisting of polyurethane, polyolefin and olefinic elastomer.

(11) The PSA sheet according to any of (1) to (10) above, wherein the base polymer of the PSA forming the PSA layer has a Tg of −25° C. or lower.

(12) The PSA sheet according to any of (1) to (11) above, wherein
the PSA forming the PSA layer comprises a tackifier resin,
the tackifier resin comprises a tackifier resin $T_L$ having a softening point of 50° C. or higher and lower than 105° C., and
the tackifier resin $T_L$ content is 15 parts by weight or greater to 100 parts by weight of the base polymer of the PSA.
(13) The PSA sheet according to (12) above, wherein the tackifier resin $T_L$ comprises a rosin-based resin.
(14) The PSA sheet according to (12) or (13) above, wherein the tackifier resin $T_L$ accounts for 30% by weight or more of all the tackifier resin in the PSA.
(15) The PSA sheet according to any of (1) to (14) above, wherein the PSA forming the PSA layer comprises a crosslinking agent, and the crosslinking agent comprises an isocyanate-based crosslinking agent.
(16) The PSA sheet according to (15) above, wherein the base polymer of the PSA forming the PSA layer is an acrylic polymer, the acrylic polymer is a polymer of a monomer mixture comprising a hydroxy group-containing monomer, the isocyanate-based crosslinking agent is used in an amount up to 40 times that of the hydroxy group-containing monomer (i.e. the weight ratio of the isocyanate-based crosslinking agent to the hydroxy group-containing monomer is 40 or less).
(17) The PSA sheet according to any of (1) to (16) above, having a recovery rate at 100% elongation of 85% or higher.
(18) The PSA sheet according to any of (1) to (17) above, having a maximum tensile strength of 7 N/10 mm or less.
(19) The PSA sheet according to any of (1) to (18) above, having an elongation at break of 200% or greater.
(20) The PSA sheet according to any of (1) to (19) above, having a thickness of 30 μm or greater.
(21) The PSA sheet according to any of (1) to (20) above for use in a flexible device.

EXAMPLES

Several Examples related to the present invention are described below, but the present invention is not intended to be limited to these specific examples. "Parts" and "%" in the description below are by weight unless otherwise specified.

Preparation of PSA Sheets

Example 1

To a reaction vessel equipped with a stirrer, thermometer, nitrogen inlet and condenser, were placed monomers (30 parts 2-ethylhexyl acrylate (2EHA), 70 parts n-butyl acrylate (BA), 3 parts acrylic acid (AA) and 0.1 part 4-hydroxybutyl acrylate (4HBA)), 0.08 part 2,2'-azobisisobutyronitrile (AIBN) as polymerization initiator, and 150 parts toluene as the polymerization solvent. The resulting mixture was allowed to undergo solution polymerization at 65° C. for 8 hours to obtain a toluene solution of acrylic polymer PA. The acrylic polymer PA had a Mw of $40 \times 10^4$.
To 100 parts of the acrylic polymer PA in the toluene solution, were added 30 parts tackifier resin TA (hydrogenated rosin glyceryl ester available from Harima Chemicals Group, Inc., product name HARITACK SE10, softening point 75° C. to 85° C.) and 3.0 parts isocyanate-based crosslinking agent (available from Tosoh Corporation, product name CORONATE L) to prepare a PSA composition A.

Two sheets of commercial release liner (available from Sumikakakoushi Co., Ltd., trade name SLB-80W3D) were obtained. To the first face (release face) of each release liner, the PSA composition A was applied to 10 μm in thickness after dried and allowed to dry at 100° C. for two minutes. In this manner, were formed 10 μm thick PSA layers (first and second PSA layers) formed from PSA A corresponding to the PSA composition A on the release faces of the two release liners, respectively.
As the substrate, was obtained 30 μm thick non-foam ether-based polyurethane resin film (available from Nihon Matai Co., Ltd., trade name ESMER URS ET-N). To the first and second faces of the substrate, the first and second PSA layers formed on the two release liner sheets were adhered. The release liners were left as they were on the PSA layers to protect the surfaces (adhesive faces) of the PSA layers. The resulting structure was passed through a laminator at 80° C. (0.3 MPa, 0.5 m/min rate) once and then aged in an oven at 50° C. for one day. In such a manner, was obtained a double-faced PSA sheet according to this Example.

Example 2

As the substrate, was used 60 μm thick non-foam ether-based polyurethane resin film (available from Nihon Matai Co., Ltd., trade name ESMER URS ET-N). The first and second PSA layers were 20 μm thick each. Otherwise in the same manner as Example 1, was obtained a double-faced PSA sheet according to this Example.

Example 3

As the substrate, was used 100 μm thick non-foam ether-based polyurethane resin film (available from Nihon Matai Co., Ltd., trade name ESMER URS ET-N). The first and second PSA layers were 50 μm thick each. Otherwise in the same manner as Example 1, was obtained a double-faced PSA sheet according to this Example.

Example 4

In place of tackifier resin TA, was used 30 parts of tackifier resin TB (polymerized rosin ester available from Arakawa Chemical Industries, Ltd., product name PENSEL D-125, softening point 120° C. to 130° C.) to 100 parts of acrylic polymer PA. Otherwise in the same manner as Example 1, was prepared a PSA composition B. Using the PSA composition B, but otherwise in the same manner as Example 2, was obtained a double-faced PSA sheet having a PSA layer formed from the PSA composition B on each face of the substrate.

Example 5

Two sheets of commercial release liner (available from Sumikakakoushi Co., Ltd., trade name SLB-80W3D) were obtained. To one face (release face) of each of these release liner sheets, the PSA composition A was applied to 20 μm in thickness after dried and allowed to dry at 100° C. for two minutes. PSA layers (the first and second PSA layers) with 20 μm in thickness were thus formed on the respective release faces of the two release liner sheets.
As the substrate, was obtained 12 μm thick transparent PET film. To the first and second faces of the substrate, the first and second PSA layers formed on the two release liner sheets were adhered. The release liners were left as they were on the PSA layers and used to protect the PSA layer surfaces (adhesive surfaces). The resulting structure was passed through a laminator at 80° C. (0.3 MPa, 0.5 m/min speed) once and then aged in an oven at 50° C. for one day. A double-faced PSA sheet according to the present Example was thus obtained.

«Measurement and Tests»

(100% Elongation Test)

Under the aforementioned conditions, the 100% elongation test was carried out to determine the recovery rate and the maximum tensile strength of each PSA sheet. Measurement samples were prepared so that the MD of the PSA sheet was aligned in the length direction.

(Holding Power Test)

To the release face of each commercial release liner (available from Sumikakakoushi Co., Ltd., product name SLB-80W3D), the PSA composition A or B was applied and allowed to dry at 100° C. for two minutes to form the corresponding PSA layer in each Example. On the release face of the release liner, the PSA layer was thus formed, having the thickness of the corresponding first PSA layer in the PSA sheet according to each Example. To one face (first face) of the PSA layer, was adhered 25 μm thick PET film as the backing material. The resultant was cut into 10 mm wide strips to fabricate test samples. In an environment at 23° C. and 50% RH, from the sample, the release liner was removed and the exposed adhesive face was press-bonded with a 2 kg roller moved back and forth once over a 10 mm wide by 20 mm long bonding area to a Bakelite plate (phenol resin plate) as the adherend. The sample thus adhered on the adherend was left standing in the same environment for 30 minutes. Subsequently, the adherend was vertically suspended with the sample's length direction in the vertical direction. To the free end of the sample, a 1 kg load was applied. Based on JIS Z 0237, the sample with the applied load was left standing in the same environment for one hour.

After one hour, with the load still applied, was determined the displacement (displacement at 1 hour) from the initial point where first applied at the top edge (more specifically, the top edge on the back of the backing material) of each sample. The measurement was carried out with three samples (N=3) for each PSA sheet and their arithmetic average value was determined.

The sample was released from the load and left standing in an environment at 23° C. and 50% RH for five minutes. Subsequently, was determined the displacement (displacement at 5 minutes after unloaded) from the initial point where first applied at the top edge (more specifically, the top edge on the back of the backing material) of each sample. With respect to the respective samples, differences (i.e. distance returned) between the displacements at 1 hour and at 5 minutes were determined; their arithmetic average value was also determined.

The results are shown in Table 1.

(Crease Resistance Test)

To the first and second adhesive faces of the double-faced PSA sheet according to each Example, was adhered 75 μm thick polyimide film (PI film) to fabricate a laminate having PI film, first PSA layer, substrate, second PSA layer and PI film in this order.

The laminate was cut to a 150 mm long by 50 mm wide rectangular shape to fabricate a test sample. Here, the MD of the PSA sheet was aligned in the length direction.

With respect to each sample, using a mandrel flex tester in conformity to IEC 62715-6-1, the flexing test was carried out under the conditions shown below.

<Mandrel Flexing Test Conditions>

Flexing radius R: 5 mm

Number of times of flexing: 100,000 times

Angle of bending: 170°

Load: 100 g

Frequency of bending: 60 cpm

Structure of sample: PI film/on-substrate double-faced PSA tape/PI film

Flexing point: 50 mm from one edge of the length direction (one widthwise edge) (in parallel with the short side of the sample)

Tested temperature: room temperature (about 23° C.)

After 100,000 times of flexing, the sample was placed on a flat plate with the face on the inside during the flexing on the top, and left standing for 20 minutes. Subsequently, the sample was brought in tight contact with the flat plate over a length of 80 mm in the length direction starting from the edge farther away from the crease of the sample (i.e. where it was bent in the test), and the height of the other edge lifted above the surface of the flat plate was determined. When the height lifted varied between the right and left ends of the sample's short side, whichever was higher was recorded as the measured height lifted. In this test, no samples showed a crease of 90° or higher. Thus, it can be said that the smaller the value of the height lifted is, the lighter the crease formed in the flexing test is (the greater the crease resistance is). Based on the height lifted, the crease resistance was graded into the three grades shown below. The results are shown in Table 1.

E: Height lifted less than 6 mm (excellent crease resistance)

G: Height lifted of 6 mm or greater and less than 12 (good crease resistance)

P: Height lifted of 12 mm or greater (poor crease resistance)

(Peel Resistance Test)

To the first and second adhesive faces of the double-faced PSA sheet according to each Example, was adhered 100 μm thick transparent PET film to fabricate a laminate having a structure of PET film/first PSA layer/substrate/second PSA layer/PET film.

The laminate was cut to a 120 mm long by 15 mm wide strip to fabricate a test sample. Here, the MD of the PSA sheet was aligned in the length direction.

With respect to each sample, using an MIT tester, the bending test was carried out under the conditions shown below. With respect to each sample tested (after 1000 times of bending), how well the tightness was maintained between the PSA sheet surface (adhesive face) and the PET film around where it was bent was visually inspected. No lifting of PET film from the adhesive face was observed in any of the samples.

<MIT Test Conditions>

System: a product of Tester Sangyo Co., Ltd., model BE-201

Clamp radius R: 0.38 mm

Number of times of flexing: 1000 times

Direction of flexing: in both ways

Angle of bending: 135° (−135° to +1350)

Structure of sample: PET film/on-substrate double-faced PSA tape/PET film

Tensile load: 1 kg

Frequency of bending: 175 cpm

Tested temperature: room temperature (about 23° C.)

TABLE 1

|  |  | Ex. 1 | Ex. 2 | Ex. 3 | Ex. 4 | Ex. 5 |
|---|---|---|---|---|---|---|
| PSA |  | A | A | A | B | A |
| Material of substrate film |  | PU | PU | PU | PU | PET |
| Structure (μm) | 1st PSA layer | 10 | 20 | 50 | 20 | 20 |
|  | Substrate | 30 | 60 | 100 | 60 | 12 |
|  | 2nd PSA layer | 10 | 20 | 50 | 20 | 20 |
| Total thickness (μm) |  | 50 | 100 | 200 | 100 | 52 |
| Recovery rate (%) |  | 88.8 | 90.1 | 87.6 | 92.0 | 10.3 |
| Holding power (mm) | At 1 hr | 1.17 | 1.27 | 1.25 | 0.20 | 1.27 |
|  | At 5 m after unloaded | 1.08 | 1.13 | 1.10 | 0.18 | 1.13 |
|  | Distance returned | 0.09 | 0.14 | 0.15 | 0.02 | 0.14 |
| Maximum tensile strength (N/10 mm) |  | 1.9 | 4.0 | 6.1 | 4.2 | 27.6 |
| Crease resistance |  | E | G | G | P | P |

PU: polyurethane

As shown in Table 1, the PSA sheets according to Examples 1 to 3 showed clearly superior flexproof properties to the PSA sheets according to Examples 4 and 5. With respect to the PSA sheet according to Example 5, due to its large maximum tensile strength, the ease of adherend flexing may be impaired depending on how it is used.

Although specific embodiments of the present invention have been described in detail above, these are merely for illustrations and do not limit the scope of claims. The art according to the claims includes various modifications and changes made to the specific embodiments illustrated above.

REFERENCE SIGNS LIST 1, 2 PSA sheets
10 substrate
10A first face
10B second face
21, 22 PSA layers
21A, 22A surfaces
31, 32 release liners
100, 200 on-release-liner PSA sheets

What is claimed is:

1. A pressure-sensitive adhesive sheet comprising a substrate and a pressure-sensitive adhesive layer provided on at least one face of the substrate, wherein
the substrate is a non-porous polyurethane-based resin film,
the pressure-sensitive adhesive layer is formed of a pressure-sensitive adhesive comprising a base polymer and a tackifier resin,
the tackifier resin consists of one or more species of tackifier resin $T_L$ having a softening point of from 50° C. to less than 105° C.,
the pressure-sensitive adhesive sheet has a thickness of 15 μm or greater,
the substrate has a thickness of 10 μm or greater, and
the pressure-sensitive adhesive layer has a thickness of 5 μm or greater; wherein
the PSA sheet shows a recovery rate at 100% elongation of 70% or higher, and
the pressure-sensitive adhesive layer shows a displacement of 0.5 mm or greater according to the following holding power test:
<Holding power test>
At 23° C., the pressure-sensitive adhesive layer is applied over a 10 mm wide by 20 mm long bonding area to a polyoxybenzylmethylenglycolanhydride plate as an adherend; a 1 kg load is applied in the length direction; after one hour, the displacement from the initial point where first applied is determined.

2. The pressure-sensitive adhesive sheet according to claim 1, showing a maximum tensile strength at 100% elongation of 15 N/10 mm or less.

3. The pressure-sensitive adhesive sheet according to claim 1, having a thickness of 250 μm or less.

4. The pressure-sensitive adhesive sheet according to claim 1, wherein
the tackifier resin content in the pressure-sensitive adhesive layer is greater than 10 parts by weight to 100 parts by weight of the base polymer.

5. The pressure-sensitive adhesive sheet according to claim 1, wherein the base polymer is an acrylic polymer.

6. The pressure-sensitive adhesive sheet according to claim 1, wherein the pressure-sensitive adhesive layer comprises a crosslinking agent.

7. The pressure-sensitive adhesive sheet according to claim 1, wherein the pressure-sensitive adhesive layer shows a distance returned of 0.05 mm or greater at 5 minutes after the load is removed in the holding power test.

8. The pressure-sensitive adhesive sheet according to claim 1, wherein the substrate is a stretchable substrate.

9. The pressure-sensitive adhesive sheet according to claim 1, wherein the base polymer has a glass transition temperature of −25° C. or lower.

10. The pressure-sensitive adhesive sheet according to claim 4, wherein
the tackifier resin content is 15 parts by weight or greater to 100 parts by weight of the base polymer.

11. The pressure-sensitive adhesive sheet according to claim 10, wherein the tackifier resin comprises a rosin-based resin.

12. The pressure-sensitive adhesive sheet according to claim 6, wherein the crosslinking agent comprises an isocyanate-based crosslinking agent.

13. The pressure-sensitive adhesive sheet according to claim 12, wherein the base polymer of the pressure-sensitive adhesive forming the pressure-sensitive adhesive layer is an acrylic polymer, the acrylic polymer is a polymer of a monomer mixture comprising a hydroxy group-containing monomer, the isocyanate-based crosslinking agent is used in an amount up to 40 times that of the hydroxy group-containing monomer.

14. The pressure-sensitive adhesive sheet according to claim 1, having a maximum tensile strength of 7 N/10 mm or less.

15. The pressure-sensitive adhesive sheet according to claim 1, having an elongation at break of 200% or greater.

16. The pressure-sensitive adhesive sheet according to claim 1, having a thickness of 30 μm or greater.

17. The pressure-sensitive adhesive sheet according to claim 1 for use in a flexible device.

* * * * *